Aug. 26, 1930.   R. L. HARTWELL   1,774,232
FILTER MEDIUM AND BODY FORMED THEREFROM
Filed March 19, 1928
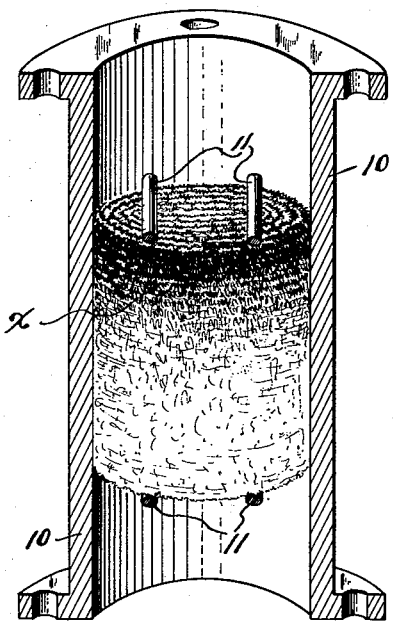
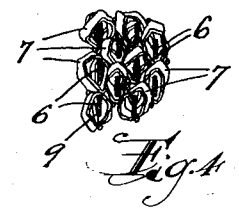
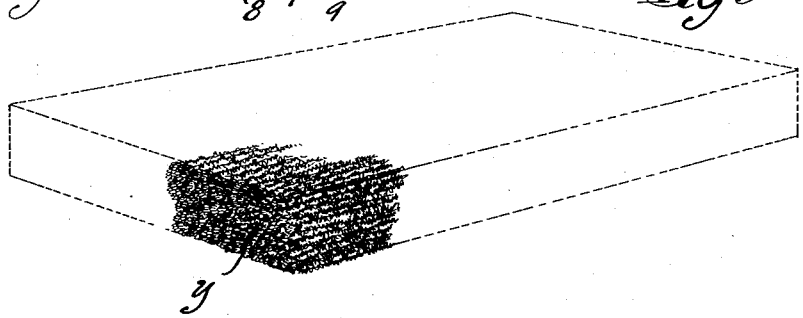
INVENTOR
Ralf L. Hartwell
BY
George D. Richards
ATTORNEY Patented Aug. 26, 1930

1,774,232

UNITED STATES PATENT OFFICE

RALF L. HARTWELL, OF ORANGE, NEW JERSEY, ASSIGNOR TO METAL TEXTILE CORPORATION, OF WEST ORANGE, NEW JERSEY, A CORPORATION OF RHODE ISLAND

FILTER MEDIUM AND BODY FORMED THEREFROM

Application filed March 19, 1928. Serial No. 262,706.

This invention relates to a novel filter medium element and to a filter body or mass formed therefrom.

This invention has for its principal object to provide a novel construction of filter medium element which may be formed into symmetrical masses or bodies of various shapes so as to furnish an interstitial mass of desired density, and of such character as to provide a porous body adapted for fluid filtration.

The use of an aggregated mass of metallic filaments such e. g. as steel wool, knitted or woven metallic fabrics, etc., as a filter medium has heretofore been known, but filter masses so constituted have not been altogether satisfactory for the reason that it is difficult to attain therewith masses of substantially uniform density, and it has also been difficult to attain therewith a wide scope with respect to desired shape variations. Furthermore the elements of such filter masses tend to easily compact together under pressure with consequent likelihood of more quickly clogging.

In the instant invention I provide a novel construction of filter medium or element which is adapted, when formed into the desired filter mass or body, to avoid the objections above mentioned. To this end my novel filter medium or element comprises a flexible carrier strand of undeterminate length upon which is more or less loosely gimped one or more metallic filaments, preferably made of flat ribbon-like wire. A filter medium or element so constructed may be wound or symmetrically piled upon itself to form a body or mass of almost any conceivable shape; and when so wrought into desired shape will furnish an interstitial or porous mass through which the fluid to be filtered may be readily passed, and which will retain its open porous character against very considerable pressure without unduly compressing or compacting together, being, therefore, less likely to clog or fill up. The density of the filter body or mass formed from the novel filter medium or element may be easily varied, i. e. a coarse interstitial or porous or a fine interstitial or porous body may be easily attained by either more loosely or more tightly applying to the carrier strand the gimped wires. Another advantage of the novel filter medium or element lies in the fact that the flexible carrier strand provides a means for controlling the desired shaping of the filter mass, and at the same time retains the irregular projections of the gimped wire members of adjacent strands in abutting relation whereby a substantial uniform porosity is attained in the built up filter mass, whether the filter medium or element is wound upon itself into cylindrical or spheroidal shapes or laid lengthwise upon itself to build up flat or substantially rectangular shapes of resultant filter bodies.

Other objects of this invention, not at this time more particularly enumerated, will be clearly understood from the following detailed description of the same.

The invention is clearly illustrated in the accompanying drawings, in which:—

Figure 1 illustrates a filter mass or body built up into cylindrical shape by winding the novel filter medium or element upon itself, said mass or body being illustrated in assembled relation to a casing (shown in section) through which the fluid to be filtered may be directed so as to pass through said filter mass or body.

Figure 2 is a fragmentary detail plan view on an enlarged scale of the filter medium or element as comprised in a flexible carrier strand having a single flat metallic wire gimped thereon; and Figure 3 is a similar view showing a plurality of flat metallic wires gimped on the flexible carrier strand.

Figure 4 is a fragmentary cross section through a filter mass or body.

Figure 5 is a view showing the filter medium or element laid up and piled upon itself in longitudinal strata to provide a rectangular filter mass or body.

Similar characters of reference are employed in all of the hereinabove described views, to indicate corresponding parts.

The novel filter medium or element comprises a flexible carrier strand 16. This carrier strand preferably consists in a flexible metallic wire, which may be flat as shown but which may be of any other cross sectional shape if desired. While I prefer to employ a flexible metallic wire for the carrier strand 6, I do not wish to be limited entirely to the use of such specific material, since a flexible strand or filament of any other suitable material may be used. On the carrier strand 6 is more or less loosely convolved by the process known as "gimping" one or more strands of flat or ribbon-like metallic wire, such, for example, as copper wire. As shown in Figure 2 I may employ one such gimped wire 7, or I may employ a plurality of such gimped wires, as shown, for example, in Figure 3 wherein two gimped wires comprising an inner wire 7 and an outer wire 8 are provided. It will be understood that more than two gimped wires may be provided. The gimped wires may be retained in the convolved relation to the carrier strand 6 by binding wires 9 if desired.

It will be apparent that the gimped wires furnish a great multiplicity of more or less laterally extending irregular projections around and throughout the length of the carrier strand 6.

In making up a filter mass or body, the carrier strand 6 with the gimped wire carried thereby may be wound upon itself or symmetrically piled upon itself to build up a mass of desired size or bulk, and that when so arranged the lateral projections of the gimped wires of adjacent abutting lengths or runs of the carrier will be brought together, but due to the irregularity of such projections will form a great multiplicity of intermediate interstices, thus providing the resultant mass with a substantially uniform interstitial or porous formation easily permeable to the fluid desired to be passed therethrough. In Figure 1 I have shown the filter body or mass *x* built up into a cylindrical mass by winding the gimped carrier strand upon itself; while in Figure 5 I have shown the filter body or mass *y* built up into flat or rectangular form by arranging the gimped carrier strand in layers of side by side lengths thereof. In either case it will be obvious that the abutting projections of the gimped wires carried by adjacent lengths of the carrier strand will more or less loosely interlock one with another whereby a characteristic porous structure is obtained which is of substantially uniform density throughout the mass. It will be understood that the degree of density of the mass, that is, the degree of porosity between a relatively fine porosity and a relatively coarse porosity may be easily attained by either more tightly or more loosely disposing the gimped wire or wires upon the carrier strand.

While for some purposes it is immaterial what the cross-sectional shape of the gimped wires may be, for many purposes, such for example as air filtering, I find that gimped wires of flat ribbon-like form are most efficient, since the flat faces or facets provided by the projections thereof not only furnish a desired baffling effect to the air passing through the filter mass, but also provide surfaces better adapted to be treated with oil or other substance calculated to catch and retain dust and foreign solids which it is desired to filter out or remove from the air.

While I have mentioned copper as a desirable metal to employ for the gimped wires, and also if desired for the carrier strand, chiefly because of its resistance to corrosion; it will be understood that any other metal or in fact other non-metallic material may be employed if desired.

Referring again to Figure 1 I have shown, merely for purposes of illustration, one method of mounting the novel filter mass in a conduit or casing 10 through which the fluid to be filtered may be passed to conduct the same through said filter mass. Transverse supporting rods 11 may be inserted through the conduit or casing 10 to retain the filter mass in position, or any other form of keeper means may be employed.

Having thus set forth the essential features of the instant invention, I claim:—

1. An element for the formation of filter bodies comprising a continuous flexible carrier strand spirally wound in a plurality of overlying layers, a flat metallic ribbon gimped thereon to provide a multiplicity of substantially lateral projections about said carrier strand throughout the length thereof adapted to engage a similar ribbon on an adjacent run of said strand, to thereby form a mass of substantially uniform porosity, and means for retaining said carrier strand and said ribbon in fixed relative positions.

2. A filter body comprising a flexible carrier strand having gimped thereon one or more metallic ribbons to provide a multiplicity of projections about said carrier strand throughout the length thereof, binding wires spirally wrapped about said gimped carrier strand for retaining said metallic ribbons in fixed position thereon, said gimped carrier strand being arranged in adjacent abutting lengths throughout the mass of the filter body with said projections interengaged to form an interstitial structure.

In testimony, that I claim the invention set forth above I have hereunto set my hand this 16th day of March 1928.

RALF L. HARTWELL.